Oct. 20, 1959
J. L. PATTON ET AL
2,909,479
HEAVY NAPHTHA AS A SPONGE OIL
Filed March 7, 1956
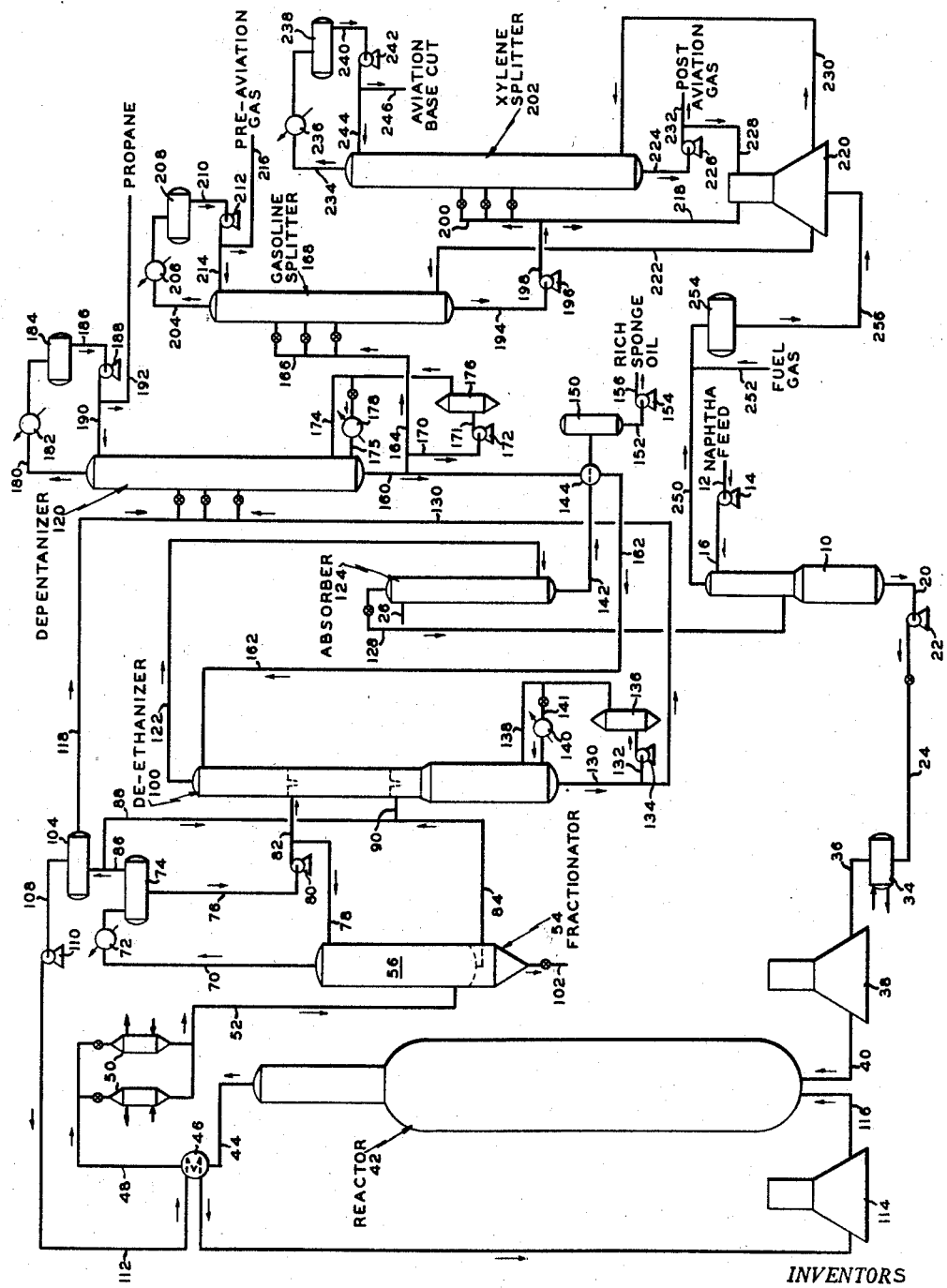
INVENTORS
MARTIN R. SMITH
JAMES L. PATTON
BY
ATTORNEYS United States Patent Office 2,909,479
Patented Oct. 20, 1959

2,909,479

HEAVY NAPHTHA AS A SPONGE OIL

James L. Patton, Ramsey, and Martin R. Smith, Glen Ridge, N.J., assignors to The M. W. Kellogg Company, Jersey City, N.J., a corporation of Delaware Application March 7, 1956, Serial No. 570,055

9 Claims. (Cl. 208—102)

This invention relates to the recovery of valuable oil constituents from recycle tail gases. In one aspect, this invention relates to a process for the recovery of valuable lean oil products found in recycle tail gases with a sponge oil which would be normally lost.

The practical utility of all distillation processes lies in their capacity to separate the components of a volatile liquid mixture. In such operations a series of fractions should be obtained, each of which is a pure compound and the full amount of each component of the original charge should be so separated. However, the vapor generated from a poly component liquid is in no case that of the most volatile component alone. Consequently, no actual distillation process achieves the perfect separation, and the components of the distillant overlap across any series of distillates, however small the fractions be taken. In many instances, the small amounts of less desired components obtained with a desired distillate fraction have no effect on its intended use. In the event these components cannot be tolerated or their recovery is desired, many elaborate treating processes have been devised. The purpose of the present invention, however, is to provide a simple economical and integrated process for the recovery of desired components normally lost from the process. More specifically, the present invention is directed to the recovery of valuable lean oil constituents found in hydroformate tail gases which would be normally lost to the producer.

An object of this invention is to recover valuable lean oil products in recycle tail gas.

A second object of this invention is to provide a process wherein products of a hydroforming process are used to absorb valuable lean oil constituents from the recycle tail gases.

Various other objects and advantages of the present invention will become apparent to those skilled in the art from the accompanying description and disclosure.

According to the improved process of the present invention, a heavy naphtha, 50–60° A.P.I. gravity from a hydroforming feed preparation unit is passed countercurrently to hydroformate tail gases in an absorption column to recover valuable lean oil constituents entrained in the tail gases. The amount of lean oil constituents usually contained in the tail gases is between about 3 to about 10 weight percent. For best operation, the absorber tower is operated in a temperature range of about 110° F. to about 150° F. under a pressure of approximately 220 pounds gauge. The hydroforming tail gas stream is introduced into the bottom of the absorber tower and passes upwardly in countercurrent contact with the downwardly flowing liquid naphtha stream introduced at the top of the column. The naphtha, commonly referred to as a "sponge oil" absorbs the lean oil constituents contained in the tail gases and is withdrawn from the bottom of the tower. The tail gases are removed from the top of the column and utilized in the process. Instead of the heavy naphtha, a post-aviation gasoline fraction, 29.0° A.P.I gravity, which is a product of the hydroforming process may be used as the sponge oil to separate the lean oil constituents from the tail gases.

Generally, the naphtha sponge oil is introduced to the top of the tower at a temperature of approximately 100° F. and the heat or temperature requirements of the column is usually maintained by the use of a relatively hot tail gas stream introduced to the bottom of the column. During the absorption, heat is liberated and the problem sometimes encountered is that of removing this heat of solution of the absorbed components by cooling means.

The tail gases separated of its lean oil constituents and having a molecular weight of approximately 10.8 is then passed to a stripping zone to separate absorbed oxygen in a naphtha feed for the hydroforming reaction. The amount of oxygen usually contained in the naphtha feed obtained from storage is between about 0.1 and about 3 weight percent. The removal of absorbed oxygen in the naptha feed is particularly desirable to prevent the formation of any resinous compounds in the feed during heating to reaction temperature.

After pretreating the feed and heating to the desired reaction temperature, approximately 850–1050° F., the naphtha feed is passed through a hydroforming conversion zone in the presence of added hydrogen and in the presence of a conventional hydroforming catalyst, such as molybdenum or platinum supported on a suitable carrier material such as alumina. The hydroforming reaction is carried out at a temperature of about 875 to about 975° F. at a pressure between about 50 and about 500 pounds per square inch gauge. Under such conditions of temperature, pressure and hydrogen concentration, the naphtha feed is converted to a product having a substantially increased octane value. The effluent from the hydroforming reaction is then passed to suitable recovery equipment for recovering various desired petroleum fractions such as an aviation gasoline fraction and a heavier aviation base fraction. Ultimately, a tail gas is recovered from the equipment comprising a series of distillation operations which is treated and used as previously described.

It is believed that the present invention may be best described by reference to the accompanying drawing which shows the inventive features of the present invention as applied, for example, to the recovery of valuable products from tail gases or recycle gases and the use of tail gases to prepare a naphtha feed for a hydroforming conversion process.

The drawing is a diagrammatical illustration in elevation of an arrangement of apparatus for the separation of hydroformate products and the recovery of valuable lean oil constituents from recycle or tail gases. Referring to the drawing, a naphtha feed, 55.0° A.P.I. gravity containing absorbed oxygen is introduced through conduit 12 at a rate of approximately 191,000 pounds per hour, pump 14, and conduit 16 to the top of feed stripper 10 and passed downwardly in countercurrent flow to tail gases obtained from the hydroforming unit, more fully described hereinafter, introduced through conduit 128 at a rate of approximately 750 pounds per hour. In feed stripper 10, the recycle gases strip oxygen from the naphtha feed and are removed from the top of the column by conduit 250 and passed to a separator 254 then through conduit 256 to the bottom of preheater 220 to be used as fuel gases in the furnaces. Additional fuel gas may be added to conduit 250 by conduit 252. The stripped naphtha feed is removed from the bottom of feed stripper 10 at a temperature in the range of 120–190° F. through conduit 20 and passed through pump 22 to conduit 24 and then to heat exchanger 34 wherein the temperature of the feed is raised to approximately 350° F. prior to entering preheat furnace 38 by conduit 36. Heat exchanger 34 may obtain heat from any of the hot products of the process. In heat exchanger 34 the fresh naphtha feed stripped of oxygen is preheated to a temperature sufficient to eliminate the corrosive action on the outside of the heater tubes within preheater 38 as previously experienced and described above. In preheater 38 the temperature of the feed is raised to approximately 950° F. and then passed through conduit 40 to a conventional hydroforming reactor 42 wherein the feed is converted to desirable cyclic compounds of higher octane rating in the presence of a hydroforming catalyst. In addition to the feed introduced to the bottom of reactor 42 by conduit 40, a sufficient quantity of recycle gas, predominantly hydrogen, obtained from the process hereinafter described is introduced by conduit 112 to preheating furnace 114 wherein the temperature is raised to approximately 1000° F. and then passed through conduit 116 at a rate of approximately 148,000 pounds per hour into the bottom of the hydroforming reactor 42. The hot products of reaction are removed from the top of the reactor at a temperature of approximately 915° F. by conduit 44 passed through heat exchanger 46 wherein the temperature is reduced to approximately 750° F. and conduit 48 to a plurality of heat exchangers 50 where the temperature is further reduced to aprpoximately 480 to 540° F. then through conduit 52 to the bottom of a fractionation and separation tower 56. In heat exchangers 50 the hydroformate products from reactor 42 are materially reduced in temperature approximately 300° F. prior to introduction into fractionator separator 56. The hydroformate products in heat exchangers 50 give up their sensible heat to bottoms withdrawn from de-ethanizer 100 and depentanizer 120 which will be described hereinafter. In fractionator separator 56 operated at a temperature range of approximately 250 to 300° F. and a pressure of approximately 245 pounds gauge, the hydroformate products free of entrained catalyst fines are removed through conduit 70 at a rate of approximately 485,000 pounds per hour to cooler 72 then to separator 74 maintained at a temperature of approximately 105° F. and a pressure of 235 pounds gauge wherein the hydroformate products are separated into a normally gaseous stream and a liquid stream. The liquid stream, 56.3° A.P.I. gravity, is withdrawn through conduit 76 at a rate of approximately 310,000 pounds per hour to pump 80, and a portion of the liquid stream, approximately 155,000 pounds per hour, is returned to the top of fractionator separator 56 by conduit 78. In fractionator separator 56 entrained catalyst fines contained in the hydroformate product are removed from the product and withdrawn to the bottom of the zone into a settling chamber 54 in the lower part of fractionator 56. The catalyst fines may be returned to the reactor 42 as desired through conduit 102. In separator 74 the gaseous products are withdrawn through conduit 86 at a rate of approximately 169,000 pounds per hour to a dry separator 104 maintained at a pressure of 234 pounds gauge and a temperature of approximately 105° F. A portion of the gaseous product is returned to the reactor 42 at a rate of approximately 137,000 pounds per hour by conduit 108, pump 110, and conduit 112 as previously described. Another portion of the gaseous product in conduit 86 is withdrawn at a rate of approximately 30,000 pounds per hour through conduit 88 and passed to the lower portion of de-ethanizer tower 100. In addition, a portion of the decanted liquid product withdrawn from the bottom of fractionator 56 at a rate of approximately 7,000 pounds per hour and a temperature of approximately 350° F. is passed through conduit 84 containing approximately all of the polymer produced in the hydroforming reactor 42 and consisting primarily of gasoline to the lower portion of the de-ethanizer tower by conduit 84 and 90. A portion of the liquid product in separator 74 withdrawn by conduit 76 is passed through conduit 82 at a rate of approximately 155,000 pounds per hour into the upper portion of de-ethanizer tower 100. De-ethanizer tower 100 is operated under temperature conditions in the range of 110 to 400° F. and at a pressure of approximately 210 to 230 pounds gauge. A low boiling fraction primarily tail gases, molecular weight 12.3, is withdrawn from the top of de-ethanizer tower 100 by conduit 122 at a rate of approximately 28,000 pounds per hour which product contains a low percentage (about 3 to 10 weight percent) of lean oil products, and is passed to the bottom of absorber tower 124 in countercurrent contact with a heavy naphtha fraction 50.6° A.P.I. gravity introduced to the top of tower 124 by conduit 26 for the purpose of absorbing the lean oil constituents from the predominantly gaseous fraction introduced to the bottom of absorber 124. The enriched heavy naphtha sponge oil is then withdrawn from the bottom of absorber tower 124 at a rate of approximately 24,000 pounds per hour through conduit 142 to separator 150 operated at a temperature of approximately 200° F. and a pressure of approximately 10 pounds gauge. The rich sponge oil is withdrawn from the bottom of separator 150 through conduit 152, pump 154, and conduit 156 to rich sponge oil storage. The gaseous products stripped of their lean oil constituents having a molecular weight of approximately 10.8 are removed from the top of absorber tower 124 at a rate of approximately 750 pounds per hour by conduit 128 and passed to feed stripper 10 for the purpose of stripping oxygen from the naphtha feed as previously described. The normally liquid products, 49.5° A.P.I. gravity, in the bottom of de-ethanizer tower 100 is withdrawn from the bottom of the column by conduit 130 at a rate of approximately 256,000 pounds per hour and passed to depentanizer 120 by conduit 130. A portion of this liquid product may be diverted through conduit 132 and pump 134 to a heat exchanger 136 and back into the bottom of the column through conduit 141 containing cooler 140 or through conduit 138. As previously described, heat exchanger 136 may be used as one of the heat exchangers 50 in the hydroformate effluent conduit 48 for the purpose of reducing the temperature of the hydroformate effluent and increasing the temperature of the de-ethanizer bottoms being circulated to the bottom of the de-ethanizer column. Any liquid products recovered in dry separator 104 may be withdrawn through conduit 118 and admixed with de-ethanizer bottoms in conduit 130 prior to entering depentanizer column 120. In depentanizer column 120 a propane-butane-pentane cut 10.8° A.P.I. gravity is removed from the top column by conduit 180, cooler 182, and separator 184 maintained at a temperature of approximately 135° F. and a pressure of approximately 100 pounds gauge. A portion of this fraction is returned by conduit 186, pump 188, and conduit 190 to the top of the depentanizer column. Another portion of this cut is withdrawn through conduit 186, pump 188 and conduit 192 at a rate of approximately 29,000 pounds per hour and sent to storage. A higher boiling fraction separated in depentanizer tower 120 which is operated at a temperature range of 180 to 410° F. and a pressure of approximately 115 pounds gauge is withdrawn from the bottom of the column through conduit 160. A portion of this fraction may be passed through conduit 170, pump 172, and conduit 171 to heat exchanger 176 wherein the temperature is raised to approximately 460° F. and back to the bottom of the column through conduit 174 or conduit 175 containing cooler 178. Heat exchanger 176 may be one of the heat exchangers 50 in the hydroformate effluent conduit 48. Another portion of the liquid fraction withdrawn through conduit 160 is reduced in temperature to about 105° F. in heat exchanger 144 and passed through conduit 162 to the top of the de-ethanizer tower 100 at a rate of approximately 93,000 pounds per hour as reflux. A third portion of the bottoms, 41.5° A.P.I. gravity, from the depentanizer tower 120 withdrawn through conduit 160 is diverted at a rate of approximately 13,500 pounds per hour through conduit 164 to tower 168 referred to as a gasoline splitter tower. In tower 168 a low boiling fraction referred to as a pre-aviation gasoline cut, 59.3° A.P.I. gravity, is withdrawn through conduit 204 to cooler 206 and separator 208 maintained at a temperature of approximately 220° F. and a pressure of approximately 15 pounds gauge. A portion of this fraction is returned as reflux to the top of tower 168 at a temperature of 220° F. through conduit 210, pump 212, and conduit 214 at a rate of approximately 186,000 pounds per hour. Another portion is withdrawn through conduit 216 to storage at a rate of approximately 38,000 pounds per hour. A higher boiling bottoms, 34.2° A.P.I. gravity, is withdrawn from the bottom of tower 168 through conduit 194, pump 196, and conduit 198 and 218 at a rate of approximately 260,000 pounds per hour, passed to furnace 220 and returned to the bottom of tower 168 by conduit 222 at a temperature of approximately 360° F. and a pressure of approximately 41 pounds gauge. Another portion of the high boiling fraction in conduit 198 is sent to tower 202 by conduit 200 at a rate of approximately 96,000 pounds per hour referred to as a xylene splitter tower. An aviation base cut is withdrawn from the top of tower 202 by conduit 234, cooler 236, and passed to separator 238 maintained at a temperature of approximately 250° F. and a pressure of approximately 0 pounds gauge. A portion of this aviation base cut may be returned to the top of the tower through conduit 240 at a rate of approximately 285,000 pounds per hour, pump 242, and conduit 244. Another portion of the aviation base cut may be withdrawn through conduit 246 at a rate of approximately 366,000 pounds per hour and sent to storage. A post-aviation gas cut, 29.0° A.P.I. gravity, is withdrawn from the bottom of xylene tower 202 through conduit 224, pump 226, and conduit 228, and passed to conventional heating furnace 220 at a rate of approximately 578,000 pounds per hour and then returned to the bottom of the xylene tower 202 at a temperature of approximately 385° F. and a pressure of approximately 28 pounds gauge by conduit 230. Another portion of the post-aviation gas may be withdrawn through conduit 232 at a rate of 16,000 pounds per hour and sent to storage. Although it is not specifically shown in the drawing, the post-aviation cut may be used as a sponge oil in absorber column 124 to scrub the entrained lean oil constituents contained in the recycle gases or tail gases passed thereto by conduit 122.

EXAMPLE 1

The basic design of a fluid hydroforming process was set by the overall requirement for a high quality aviation gasoline blending stock. In order to produce the required aviation blending material, it was necessary to reform a select, narrow boiling range (224–272° F.) naphtha at a high severity. Run I was continued for 42 days. Run II was started and continued with excellent success. As the carbon and sulfur content of the catalyst was lowered to reasonable levels, attributed to good catalyst circulation, the effective activity of the catalyst improved. After 120 days of operation, aviation gasoline of the desired octane rating was continuously produced in the process as shown in the drawing.

The tables (II through VIII) indicate the operation of the specific equipment shown in the drawing in accordance with this invention and indicates the successful operation and results that are obtained by absorption with a heavy naphtha of valuable hydrocarbons from the tail gas of the process shown in the drawing. These tables are actual working examples of an operation using specific conditions of operation to achieve the various products shown in the drawing and more specifically identified in the tables.

TABLE I

|  | Operating conditions—Run II | | | | |
|---|---|---|---|---|---|
| Number days | 8 | 15 | 15 | 15 | 6 |
| Feed rate, b.p.d | 17,570 | 17,790 | 18,300 | 18,880 | 18,550 |
| Reactor temp., ° F | 918 | 920 | 911 | 908 | 906 |
| Cat. to oil ratio | 0.87 | 0.75 | 0.84 | 0.74 | 0.77 |
| Space velocity, w./hr./w | 0.34 | 0.35 | 0.34 | 0.35 | 0.33 |
| Reactor pressure, p.s.i.g | 225 | 225 | 225 | 225 | 225 |
| $C_5$+hydroformate oct., F-1 (clear) | 93.4 | 92.2 | 92.0 | 90.9 | 90.6 |
| Recycle gas, s.c.f./b | 5,480 | 5,410 | 5,330 | 5,160 | 5,160 |
| Mol percent $H_2$ | 67.5 | 64.0 | 66.1 | 66.6 | 66.2 |
| Rec. gas furnace out, ° F | 1,154 | 1,171 | 1,157 | 1,152 | 1,148 |
| Naphtha furnace out, ° F | 961 | 962 | 951 | 947 | 936 |
| Carbon on cat., weight percent: | | | | | |
| Spent | 0.59 | 0.70 | 0.66 | 0.74 | 0.71 |
| Regenerated | 0.02 | 0.03 | 0.04 | 0.06 | 0.05 |
| Sulfur on spent cat., weight percent | 0.05 | 0.07 | 0.07 | 0.10 | 0.04 |
| Reactor bed height, ft.[1] | 46.5 | 45.0 | 46.0 | 44.5 | 45.5 |
| Catalyst holdup, M lbs.: | | | | | |
| Reactor | 571.0 | 583.0 | 594.0 | 592.0 | 616.0 |
| Regenerator | 10.3 | 11.9 | 9.8 | 10.0 | 16.4 |
| Total [2] | 601.3 | 594.9 | 623.8 | 622.0 | 652.4 |
| Reactor density, #/ft.³ | 43 | 44 | 46 | 47 | 48 |
| Regenerator holdup time, min | 3.68 | 4.89 | 3.48 | 3.89 | 6.23 |
| Cat. circulation, #/hr | 168,000 | 146,000 | 169,000 | 154,000 | 158,000 |
| Regen. temp., ° F | 1,097 | 1,109 | 1,084 | 1,107 | 1,102 |
| Combustion air, #/hr | 21,900 | 21,960 | 22,540 | 22,210 | 22,610 |
| Regen. density, #/ft.³ | 22 | 18 | 19 | 19 | 25 |

[1] Feed above grid.
[2] 20,000# catalyst in lines, stripper and hopper (est.).

TABLE II

| Date | Conversion of naphthenes | | | | | | |
|---|---|---|---|---|---|---|---|
| | 6/3 | 6/7 | 6/10 | 6/14 | 7/8 | 7/12 | 7/19 |
| Feed stock, b.p.d.[1] | 17,730 | 17,500 | 17,970 | 17,600 | 18,672 | 19,050 | 18,220 |
| Paraffins, vol. percent | 43.2 | 44.6 | 44.1 | 44.1 | 47.0 | 46.3 | 44.0 |
| Naphthenes | 44.2 | 42.8 | 43.7 | 43.7 | 41.8 | 41.0 | 41.0 |
| Aromatics | 12.6 | 12.6 | 12.2 | 12.2 | 11.2 | 12.7 | 15.0 |
| Pre-aviation, b.p.d. | 7,250 | 6,860 | 6,825 | 6,510 | 8,266 | 8,160 | 6,490 |
| Par., vol. percent | 43.6 | 45.5 | 45.4 | 40.5 | 42.8 | 42.2 | 42.4 |
| Naph. | 16.4 | 17.5 | 14.5 | 18.2 | 16.2 | 17.7 | 17.8 |
| Arom. | 40.0 | 37.0 | 40.1 | 41.3 | 41.0 | 40.1 | 39.8 |
| Aviation base, b./d. | 3,230 | 3,200 | 3,010 | 2,860 | 2,619 | 2,440 | 3,120 |
| Par., vol. percent | 15.2 | 12.2 | 12.1 | 9.0 | 14.7 | 20.5 | 16.1 |
| Naph. | 8.1 | 7.3 | 8.2 | 7.2 | 6.4 | 7.8 | 6.2 |
| Arom. | 76.7 | 80.5 | 79.7 | 83.8 | 78.9 | 71.7 | 77.9 |
| Post aviation, b.p.d. | 1,955 | 2,025 | 2,280 | 2,220 | 2,861 | 3,200 | 3,450 |
| Par., vol. percent | 6.0 | 3.1 | 5.1 | 4.2 | 8.0 | 8.1 | 9.2 |
| Naph. | 4.2 | 2.1 | 3.3 | 3.2 | 4.6 | 5.5 | 5.5 |
| Arom. | 89.8 | 94.8 | 91.6 | 92.6 | 87.4 | 86.4 | 85.3 |
| Polymer, b.p.d.[2] | 288 | 288 | 324 | 270 | 279 | 285 | 270 |
| Depentanized hydrofor. (as produced): | | | | | | | |
| Paraffins, b.p.d. | 3,768 | 3,573 | 3,580 | 2,920 | 4,150 | 4,206 | 3,569 |
| Naphthenes | 1,533 | 1,477 | 1,312 | 1,460 | 1,640 | 1,809 | 1,543 |
| Aromatics | 7,422 | 7,323 | 7,547 | 7,410 | 8,235 | 8,070 | 8,218 |
| Unconverted naph., percent | 20.0 | 19.7 | 16.7 | 19.0 | 21.0 | 23.2 | 20.6 |
| Naph. conversion, percent | 80.0 | 80.3 | 83.3 | 81.0 | 79.0 | 76.8 | 79.4 |
| Total $C_5$ to E.P., b.p.d. | 14,055 | 13,419 | 14,116 | 13,805 | 15,123 | 15,513 | 14,727 |
| Octane on $C_5$+ | 89.8 | 92.1 | 91.4 | 92.3 | 90.0 | 90.4 | 91.3 |
| $C_5$+ analysis: | | | | | | | |
| Naph., vol. percent | 10.9 | 11.0 | 9.3 | 10.6 | 10.8 | 11.7 | 10.5 |
| Arom. | 52.8 | 54.5 | 53.5 | 53.6 | 54.4 | 52.0 | 55.8 |
| Par. (by diff.) | 36.3 | 35.5 | 37.2 | 35.8 | 34.8 | 36.3 | 33.7 |

[1] Adjusted to 100% output basis.
[2] Assumed 100% aromatic.

TABLE III

*Tower 56 operation—fractionator*

| Flows, b.p.d.: | Operation |
|---|---|
| Top reflux | 11,240 |
| Slurry reflux | 33,840 |
| Decant oil (polymer) | 284 |
| Slurry return | 275 |

Temperatures, °F.:
- Tower top _____ 300
- Tower bottom _____ 399
- Slurry return _____ 354
- Reflux drum _____ 106

Pressures, p.s.i.g.:
- Tower _____ 225
- Reflux drum _____ [1] 215
- Slurry settler _____ 267

Catalyst Concentration, #/gal.:
- Decant oil _____ Trace
- Slurry return _____ None Polymer inspections:
- Gravity, °API _____ 24.0
- ASTM—
  - I.B.P. _____ 234
  - 10% _____ 294
  - 30% _____ 328
  - 50% _____ 369
  - 70% _____ 462
  - 90% _____ 563
  - Percent at 700 °F. _____ 98.7

[1] Est. (gauge reads 207 but in error).

TABLE IV

*Tower 100 operation—de-ethanizer*

| Flows: | Actual operation |
|---|---|
| Fractionator gas, m.p.h. | 1950 |
| Fractionator liquid, b.p.d. | 16,200 |
| Lean oil, b.p.d. | 6,000 |
| Reboiler circulation, b.p.d. | 42,000 |
| Bottoms, b.p.d. | 22,251 |
| Overhead, m.p.h. | Not metered |
| Reboiler duty, mm. B.t.u./hr. | 43.92 |

Temperatures, °F.:
- Top tower _____ 106
- Lean oil _____ 93
- 42nd tray _____ 196
- 46th tray _____ 205
- Bottom tower _____ 403
- Reboiler out _____ 467

Tower pressure, p.s.i.g. _____ 215

| Gas analyses (M.S.), Mol. percent | Feed | Overhead |
|---|---|---|
| $N_2+CO_2$ | 2.4 | 2.7 |
| $H_2$ | 67.5 | 68.1 |
| $C_1$ | 11.8 | 12.3 |
| $C_2=$ | 0.1 | |
| $C_2+$ | 8.2 | 9.6 |
| $C_3=$ | 0.6 | 0.4 |
| $C_3+$ | 4.5 | 3.9 |
| $iC_4$ | 0.9 | 0.3 |
| $C_4=$ | | |
| $nC_4$ | 1.1 | 0.3 |
| $iC_5$ | | |
| $nC_5$ | 0.7 | 0.6 |
| cyclo $C_5$ | 0.1 | 0.1 |
| $C_6+$ | 2.1 | 1.7 |
| $C_3$ recovery, mol. percent | 51.2 | |
| $C_4$ recovery, mol. percent | 91.3 | |

TABLE V

*Tower 124 Operation—absorber*

| Flows: | Actual |
|---|---|
| De-ethanizer overhead, m.p.h. | Not metered |
| Sponge oil, b.p.d. (post aviation) | 1498 |
| Rich oil, b.p.d. | 1658 |
| Tail gas, m.p.h. | 1984.3 |
| Flash drum 150 gas, m.p.h. | 5.3 |

Temperatures, °F.:
- Tower top _____ 108
- Tower bottom _____ 109
- Sponge oil in _____ 97
- Drum 150 _____ 218
- Rich oil out _____ 103

Pressures, p.s.i.g.:
- Tower 124 _____ 200
- Drum 150 _____ 24

| Gas analyses (M.S.), Mol. percent | Absorber 124 overhead | Flash drum 150 |
|---|---|---|
| $N_2+CO_2$ | 2.7 | 0.7 |
| $H_2$ | 69.1 | 11.7 |
| $C_1$ | 12.7 | 12.5 |
| $C_2-$ | 0.1 | 0.2 |
| $C_2+$ | 10.3 | 37.9 |
| $C_3-$ | 0.2 | 0.1 |
| $C_3+$ | 3.8 | 27.1 |
| $iC_4$ | 0.4 | 4.6 |
| $C_4-$ | | 0.1 |
| $nC_4$ | 0.2 | 1.6 |
| $iC_5$ | | 0.2 |
| $nC_5$ | | 0.2 |
| cyclo $C_5$ | | 0.3 |
| $C_6+$ | 0.5 | 3.0 |

TABLE VI

*Tower 120 operation—de-pentanizer*

| | Actual |
|---|---|
| Flows, b.p.d.: | |
| Feed | 22,251 |
| Reflux | 12,500 |
| Reboiler | 24,850 |
| Overhead product | 2,500 |
| Reflux ratio, mols reflux/mol product | 5.0 |
| Temperatures, °F.: | |
| Tower top | 168 |
| 6th tray | 222 |
| 25th tray | 387 |
| Tower bottom | 410 |
| Reboiler outlet | 452 |
| Reflux drum | 117 |
| Tower pressure, p.s.i.g. | 100 |
| Reboiler duty, mm. B.t.u./hr. | 39.3 |
| Trim cooler duty, mm. B.t.u./hr. | 22.5 |
| Net reboiler heat to tower, mm. B.t.u./hr. | 16.8 |
| Overhead condenser duty, mm. B.t.u./hr. | 20.8 |
| Overhead, m.p.h.: | |
| $C_1$ | 1.3 |
| $C_2-$ | 0.5 |
| $C_2+$ | 1.4 |
| $C_3-$ | 1.8 |
| $C_3+$ | 83.4 |
| $iC_4$ | 57.6 |
| $C_4-$ | 0.4 |
| $nC_4$ | 72.8 |
| $iC_5$ | 76.6 |
| $nC_5$ | 49.7 |
| cyclo $C_5$ | 5.9 |
| $C_6+$ | 4.2 |
| Bottoms inspections: | |
| °API | 44.3 |
| ASTM— | |
| I.B.P. | 201 |
| 10% | 227 |
| 30% | 242 |
| 50% | 258 |
| 70% | 276 |
| 90% | 303 |
| Dry point | 336 |
| End point | 365 |
| R.V.P. | 0.9 |
| F-1 octane (clear) | 91.0 |

TABLE VII

*Tower 168 operation—gasoline splitter*

| | Actual |
|---|---|
| Flows, b.p.d.: | |
| Feed | 13,751 |
| Reflux | 16,150 |
| Reboiler | 22,500 |
| Overhead product | 7,942 |
| Reflux ratio, mols reflux/mol product | 2.04 |
| Temperatures, °F.: | |
| Tower top | 304 |
| 6th tray | 327 |
| 26th tray | 379 |
| Tower bottom | 391 |
| Reboiler outlet | 421 |
| Reflux drum | 184 |
| Tower pressure, p.s.i.g. | 32 |
| Reboiler duty, mm. B.t.u./hr. | 39.7 |
| Overhead condenser duty, mm. B.t.u./hr. | 45.2 |
| Pre-aviation inspections (overhead): | |
| °API | 51.8 |
| ASTM— | |
| I.B.P. | 192 |
| 10% | 207 |
| 30% | 216 |
| 50% | 223 |
| 70% | 232 |
| 90% | 244 |
| Dry point | 261 |
| End point | 307 |
| R.V.P. | 1.4 |
| F-1 octane (clear) | 78.1 |

TABLE VIII

*Tower 202 operation—xylene splitter*

| | Actual |
|---|---|
| Flows, b.p.d.: | |
| Feed | 5,809 |
| Reflux | 21,070 |
| Reboiler | 44,400 |
| Overhead product | 2,538 |
| Bottoms product | 3,271 |
| Reflux ratio, mols reflux/mol product | 8.29 |
| Temperatures, °F.: | |
| Tower top | 320 |
| 13th tray | 321 |
| 23d tray | 327 |
| Reflux drum | 183 |
| Tower bottom | 373 |
| Reboiler outlet | 409 |
| Tower pressure, p.s.i.g. | 15.5 |
| Reboiler duty, mm. B.t.u./hr. | 54.9 |
| Overhead condenser duty, mm. B.t.u./hr. | 59.0 |

| Product inspections | Avia.-base | Post-avia. |
|---|---|---|
| Gravity, °API | 37.4 | 33.0 |
| ASTM: | | |
| I.B.P. | 273 | 302 |
| 10% | 274 | 308 |
| 30% | 275 | 312 |
| 50% | 276 | 317 |
| 70% | 276 | 322 |
| 90% | 277 | 334 |
| Dry Point | 278 | |
| End Point | 320 | 386 |
| R.V.P. | 0.2 | 0.1 |
| Paraffins, Vol. Percent | 20.8 | 8.8 |
| Naphthenes | 7.7 | 5.7 |
| Total aromatics | 71.5 | 85.5 |
| Para xylene | 22.7 | |
| Meta xylene | 27.0 | |
| Ortho xylene | 6.9 | |
| Ethyl benzene | 14.8 | |
| $C_9$ aromatics | 0.1 | |

Various pumps, valves, and auxiliary equipment have been eliminated from the drawing as a matter of convenience, and their use and location will become apparent to those skilled in the art. Various modifications and steps of the process and arrangement of apparatus of this invention will become apparent to those skilled in the art without departing from the scope of this invention. The theories and specific examples are offered as a means for further understanding the invention and are not to be construed as unnecessarily limiting to the invention.

Having described our invention, we claim:

1. A process for treating the reaction product of a hydrocarbon conversion process which comprises: separating said reaction product into a liquid product fraction and a gaseous fraction containing entrained liquid product; combining at least a portion of said gaseous fraction with at least a portion of said liquid product; separating the fractions thus combined into a gaseous fraction comprising lean-oil constituents and substantially free of components higher boiling than ethane and a liquid fraction comprising components higher boiling than ethane; passing the liquid fraction thus obtained to a second distillation zone; recovering a depentanized liquid product from said second distillation zone; passing a portion of said recovered depentanized liquid product from said second distillation zone to said first distillation zone as reflux thereto; passing the gaseous fraction thus obtained to an absorption zone; in said absorption zone contacting said gaseous fraction with a sponge oil to remove lean-oil constituents from said fraction; and recovering thus-enriched sponge oil as a product of the process.

2. The process of claim 1 in which the sponge oil comprises a naphtha having an API gravity from about 50° to about 60°.

3. The process of claim 1 in which the sponge oil comprises a post-aviation gasoline fraction.

4. A process for treating the reaction product of a hydrocarbon conversion process which comprises: separating said reaction product into a liquid product fraction and a gaseous fraction containing entrained liquid product; combining at least a portion of said gaseous fraction with at least a portion of said liquid product; separating the fractions thus combined into a gaseous fraction comprising lean-oil constituents and substantially free of components higher boiling than ethane and a liquid fraction comprising components higher boiling than ethane; passing the gaseous fraction thus obtained to an absorption zone; in said absorption zone contacting said gaseous fraction with a sponge oil to remove lean-oil constituents from said fraction; recovering thus-enriched sponge oil as a product of the process; passing said last-mentioned liquid fraction to a depentanizing zone; in said depentanizing zone separating said fraction into a low boiling fraction comprising components having less than 6 carbon atoms per molecule and a high boiling fraction comprising components having at least 6 carbon atoms per molecule; passing a portion of said high boiling fraction from said depentanizing zone to said de-ethanizing zone as reflux thereto; and passing said high boiling fraction to said absorption zone as an absorption medium.

5. The process of claim 4 in which a portion of said first-mentioned gaseous fraction is condensed and passed to said de-ethanizing step.

6. A process for treating the reaction product of a hydrocarbon conversion process which comprises: passing said product to a separation zone; separating said reaction product in said zone at a temperature between about 250° F. and about 300° F. into a liquid product fraction and a gaseous fraction containing entrained liquid product; combining at least a portion of said gaseous fraction with at least a portion of said liquid product; separating the fractions thus combined into a gaseous fraction comprising lean-oil constituents and substantially free of components higher boiling than ethane and a liquid fraction comprising components higher boiling than ethane; passing the liquid fraction thus obtained to a second distillation zone; recovering a depentanized liquid product from said second distillation zone; passing a portion of said recovered depentanized liquid product from said second distillation zone to said first distillation zone as reflux thereto; passing the gaseous fraction thus obtained to an absorption zone; in said absorption zone contacting said gaseous fraction with a sponge oil at a temperature between about 110° F. and about 150° F. to remove lean-oil constituents from said fraction; and recovering thus-enriched sponge oil as a product of the process.

7. A process for treating the reaction product of a hydrocarbon conversion process which comprises: passing said product to a separation zone; separating said reaction product in said zone at a temperature between about 250° F. and about 300° F. into a liquid product fraction and a gaseous fraction containing entrained liquid product; combining at least a portion of said gaseous fraction with at least a portion of said liquid product; separating the fractions thus combined into a gaseous fraction comprising lean-oil constituents and substantially free of components higher boiling than ethane and a liquid fraction comprising components higher boiling than ethane; passing the gaseous fraction thus obtained to an absorption zone; in said absorption zone contacting said gaseous fraction with a sponge oil at a temperature between about 110° F. and about 150° F. to remove lean-oil constituents from said fraction; recovering thus-enriched sponge oil as a product of the process; passing said last-mentioned liquid fraction to a depentanizing zone; in said depentanizing zone separating said fraction into a low boiling fraction comprising components having less than 6 carbon atoms per molecule and a high boiling fraction comprising components having at least 6 carbon atoms per molecule; passing a portion of said high boiling fraction from said depentanizing zone to said de-ethanizing zone as reflux thereto; and passing said high boiling fraction to said absorption zone as an absorption medium.

8. An improved integrated process for recovery of valuable products, which comprises hydroforming a naphtha fraction in the presence of a hydroforming catalyst, recovering the hydroformate product and cooling the same, passing the cooled hydroformate product to an initial separation zone, recovering a gaseous fraction containing entrained liquid product from the upper portion of said initial separation zone and liquid product from the lower portion thereof; passing a portion of said gaseous fraction containing entrained liquid product and said liquid product recovered from said initial separation step to a distillation zone refluxed with a product of the process hereinafter described, recovering a gaseous product from the upper portion of said distillation zone containing entrained liquid product, recovering liquid product from the lower portion of said distillation zone, passing said liquid product from said first distillation zone to a second distillation zone, recovering a depentanized liquid product from said second distillation zone, passing a portion of said recovered depentanized liquid product to said first distillation zone as reflux thereto, passing another portion of said depentanized liquid product to further separation to recover gasoline products, passing said gaseous fraction containing entrained liquid product recovered from said first distillation zone to an absorption zone, in said absorption zone contacting said gaseous fraction containing entrained liquid with a gasoline product of the process to absorb said entrained liquid, and recovering said enriched gasoline as a product of the process.

9. A hydroforming process which comprises passing a naphtha feed in contact with a hydroforming catalyst to convert the naphtha into valuable hydroformate product, passing said hydroformate product to an initial separation zone operated at a temperature in the range of from about 250 to about 300° F. and a pressure of about 245 p.s.i.g., separating said hydroformate product in said initial separation zone into a liquid fraction and a gaseous fraction containing entrained liquid product, combining a portion of said gaseous fraction containing entrained liquid product with said liquid fraction, passing said combined fraction to a de-ethanizer zone operated at a temperature in the range of from about 110° F. to about 400° F. and a pressure of about 210 to 230 p.s.i.g., to effect separation of a gaseous product containing entrained liquid product from the liquid hydroformate product, recovering tail gases containing from about 3 to about 10 percent by weight liquid product from the upper portion of said de-ethanizer zone, recovering liquid hydroformate product from the lower portion of said de-ethanizer zone, passing a portion of said liquid hydroformate product recovered from said de-ethanizer to a depentanizer zone, recovering a depentanized liquid product from the lower portion of said depentanizer zone, passing a portion of said depentanized liquid product to the upper portion of said de-ethanizer zone as reflux thereto, passing another portion of said depentanized liquid product to further separation to recover a post-aviation gasoline fraction, passing a portion of said post-aviation gasoline fraction to an absorption zone, passing said gaseous fraction containing entrained liquid product recovered from said de-ethanizer zone to said absorption zone, in said absorption zone contacting said gaseous fraction containing entrained liquid product with said gasoline fraction to absorb entrained liquid product of said gaseous fraction, said absorption zone being operated in a temperature range of about 110° F. to about 150° F., recovering a gaseous fraction substantially free of entrained liquid product from the upper portion of said absorption zone, and recovering an enriched gasoline fraction from the lower portion of said absorption zone as a product of the process.

References Cited in the file of this patent
UNITED STATES PATENTS

| | | |
|---|---|---|
| 2,398,674 | Schulze | Apr. 16, 1946 |
| 2,719,816 | Rich | Oct. 4, 1955 |
| 2,733,192 | Sage | Jan. 31, 1956 |
| 2,805,979 | Vermilion | Sept. 10, 1957 |